United States Patent
Hakola et al.

(10) Patent No.: US 10,880,845 B2
(45) Date of Patent: Dec. 29, 2020

(54) SIGNALING PROCEDURE FOR NEW RADIO INITIAL ACCESS

(71) Applicant: Nokia Technologies Oy, Espoo (FI)

(72) Inventors: Sami-Jukka Hakola, Kempele (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 171 days.

(21) Appl. No.: 15/961,354

(22) Filed: Apr. 24, 2018

(65) Prior Publication Data

US 2018/0324721 A1 Nov. 8, 2018

Related U.S. Application Data

(60) Provisional application No. 62/502,014, filed on May 5, 2017.

(51) Int. Cl.
*H04W 56/00* (2009.01)
*H04L 5/00* (2006.01)
*H04W 74/08* (2009.01)

(52) U.S. Cl.
CPC ......... *H04W 56/001* (2013.01); *H04L 5/0048* (2013.01); *H04L 5/0053* (2013.01); *H04W 56/0015* (2013.01); *H04W 74/0833* (2013.01)

(58) Field of Classification Search
CPC .. H04L 5/0048; H04L 5/0053; H04W 56/001; H04W 56/0015; H04W 74/0833
See application file for complete search history.

(56) References Cited

U.S. PATENT DOCUMENTS

| | | | |
|---|---|---|---|
| 6,286,104 B1 * | 9/2001 | Buhle | H04L 63/105 707/999.009 |
| 10,362,610 B2 * | 7/2019 | Chen | H04L 5/0048 |

OTHER PUBLICATIONS

"3rd Generation Partnership Project; Technical Specification Group Radio Access Network; NR; Physical channels and modulation (Release 15)", 3GPP TS 38.211, V15.0.0, Dec. 2017, pp. 1-73.
"3rd Generation Partnership Project; Technical Specification Group Radio Access Network; NR; Physical layer procedures for control (Release 15)", 3GPP TS 38.213, V15.0.0, Dec. 2017, pp. 1-56.

* cited by examiner

*Primary Examiner* — Robert M Morlan
(74) *Attorney, Agent, or Firm* — Harrington & Smith

(57) ABSTRACT

In accordance with an example embodiment of the present invention, a method comprising: initiate, by a user equipment, a search of at least one carrier frequency as part of an initial access procedure; determine possible values for a first parameter and a second parameter based on the at least one carrier frequency, wherein the first parameter relates to a synchronization signal block index and the second parameter relates to at least one of: a periodicity and a synchronization signal block configuration; detect a reference signal from a first cell comprising signaling information indicating a first value for the first parameter and a second value for the second parameter; and synchronize timing for transmission and/or reception of data with the first cell based at least on the first value and the second value.

20 Claims, 7 Drawing Sheets

SIGNALING PROCEDURE FOR NEW RADIO INITIAL ACCESS

TECHNICAL FIELD

This invention relates generally to wireless networking and, more specifically, relates to initial access design and signaling procedure for wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

An initial access signaling procedure is the procedure that allows a user equipment (UE) to establish a physical link connection with a base station (BS) in a wireless network. The initial access signaling procedure typically utilizes two synchronization signals, namely, the primary synchronization signal (PSS) and the secondary synchronization signal (SSS).

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: initiate a search of at least one carrier frequency as part of an initial access procedure; determine possible values for a first parameter and a second parameter based on the at least one carrier frequency, wherein the first parameter relates to a synchronization signal block index and the second parameter relates to at least one of: a periodicity and a synchronization signal block configuration; detect a reference signal from a first cell comprising signaling information indicating a first value for the first parameter and a second value for the second parameter; and synchronize timing for transmission and/or reception of data with the first cell based at least on the first value and the second value.

According to a second aspect of the present invention, a method comprising: initiating, by a user equipment, a search of at least one carrier frequency as part of an initial access procedure; determining possible values for a first parameter and a second parameter based on the at least one carrier frequency, wherein the first parameter relates to a synchronization signal block index and the second parameter relates to at least one of: a periodicity and a synchronization signal block configuration; detecting a reference signal from a first cell comprising signaling information indicating a first value for the first parameter and a second value for the second parameter; and synchronizing timing for transmission and/or reception of data with the first cell based at least on the first value and the second value.

According to a third aspect of the present invention, a computer program product comprising a non-transitory computer-readable medium bearing computer program code embodied therein for use with a computer, the computer program code comprising code for: initiating a search of at least one carrier frequency as part of an initial access procedure; determining possible values for a first parameter and a second parameter based on the at least one carrier frequency, wherein the first parameter relates to a synchronization signal block index and the second parameter relates to at least one of: a periodicity and a synchronization signal block configuration; detecting a reference signal from a first cell comprising signaling information indicating a first value for the first parameter and a second value for the second parameter; and synchronizing timing for transmission and/or reception of data with the first cell based at least on the first value and the second value.

According to a fourth aspect of the present invention, an apparatus comprising: at least one processor; and at least one memory including computer program code, wherein the at least one memory and the computer program code are configured to, with the at least one processor, cause the apparatus to perform at least the following: configure at least one synchronization signal block for a first cell of the base station, the at least one synchronization signal block comprises a reference signal includes signaling information, wherein the signaling information comprises: an indication of a synchronization signal block index, and at least one of: an indication of a periodicity of the first cell and an indication of a synchronization signal block configuration of the first cell; and transmit to one or more user equipments in the first cell the at least one synchronization block.

According to a fifth aspect of the present invention, a method comprising: configuring, by a base station, at least one synchronization signal block for a first cell of the base station, the at least one synchronization signal block comprises a reference signal includes signaling information, wherein the signaling information comprises: an indication of a synchronization signal block index, and at least one of: an indication of a periodicity of the first cell and an indication of a synchronization signal block configuration of the first cell; and transmitting to one or more user equipments in the first cell the at least one synchronization block.

According to a sixth aspect of the present invention, a computer program product comprising a non-transitory computer-readable medium bearing computer program code embodied therein for use with a computer, the computer program code comprising code for: configuring, by a base station, at least one synchronization signal block for a first cell of the base station, the at least one synchronization signal block comprises a reference signal includes signaling information, wherein the signaling information comprises: an indication of a synchronization signal block index, and at least one of: an indication of a periodicity of the first cell and an indication of a synchronization signal block configuration of the first cell; and transmitting to one or more user equipments in the first cell the at least one synchronization block.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Although the description below generally refers to LTE terms, it should be understood it is also applicable to 5G. For instance, the term eNB (LTE base station) as used herein is equally applicable to a 5G base station, commonly referred to as gNB.

The exemplary embodiments herein describe techniques for a signaling procedure for new radio initial access. Additional description of these techniques is presented after a system into which the exemplary embodiments may be used is described.

Figure 1:
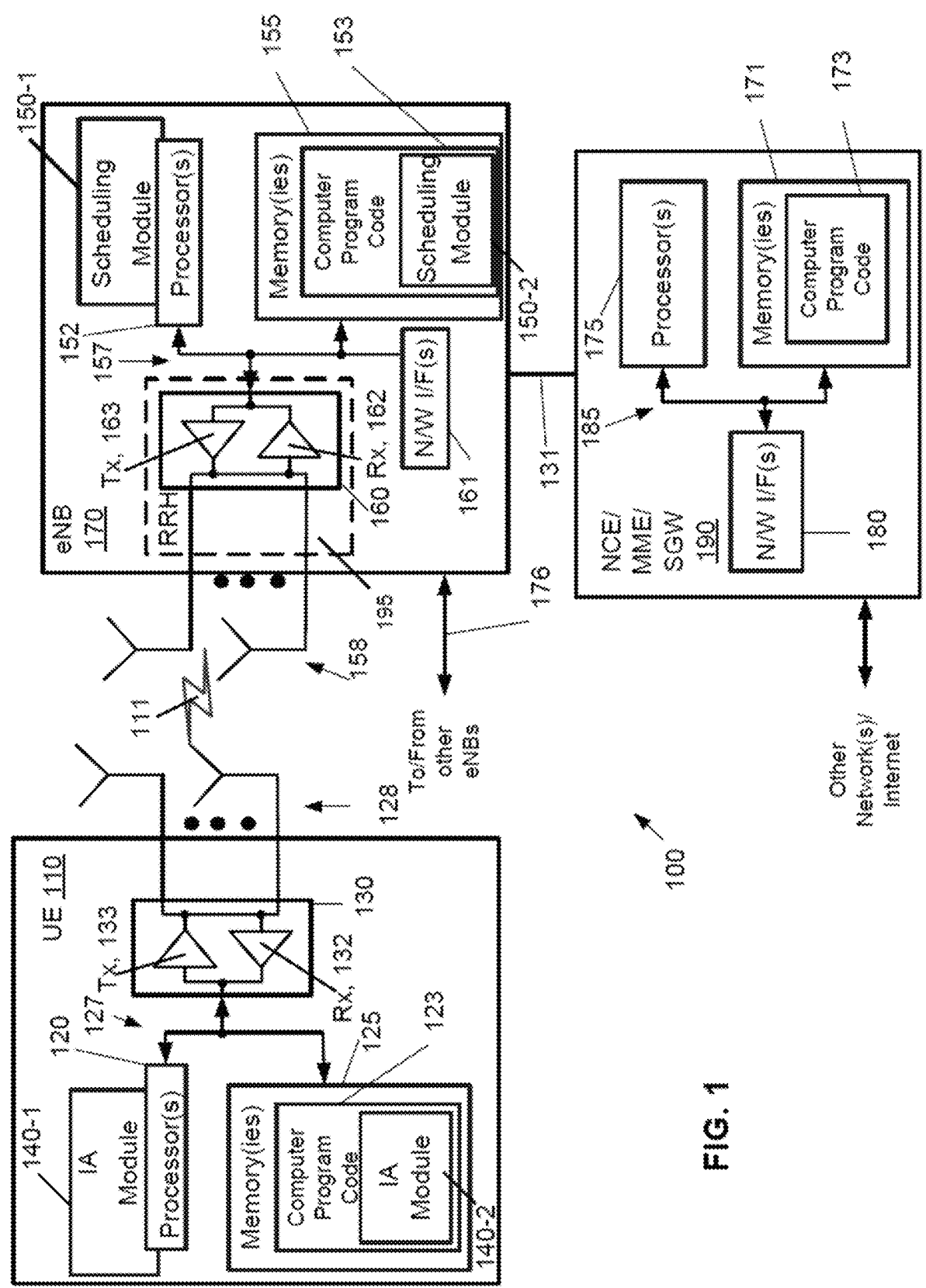
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes an initial access (IA) module, comprising one of or both parts 140-1 and/or 140-2, which may be implemented in a number of ways. The initial access module may be implemented in hardware as initial access module 140-1, such as being implemented as part of the one or more processors 120. The initial access module 140-1 may be implemented also as an integrated circuit or through other hardware such as a programmable gate array. In another example, the initial access module may be implemented as initial access module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a scheduling module, comprising one of or both parts 150-1 and/or 150-2, which may be implemented in a number of ways. The scheduling module may be implemented in hardware as scheduling module 150-1, such as being implemented as part of the one or more processors 152. The scheduling module 150-1 may be implemented also as an integrated circuit or through other hardware such as a programmable gate array. In another example, the scheduling module may be implemented as scheduling module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Embodiments described herein are related to 3GPP NR physical layer design and the first release of NR physical layer specifications (3GPP Release 15). More specifically, embodiments herein relate NR initial access design and signaling procedure. Based on the current agreements, the following table shows how certain information (e.g. timing synchronization) is acquired by the UE in the initial cell search and access:

TABLE 1

| What Functionality? | How to signal to UE? |
| --- | --- |
| Symbol timing | NR-PSS |
| Slot timing/ subframe timing | SS block index indication |
| Frame timing | Specification indicates fixed set of time domain allocations for SS blocks + SS block index indication |
| Frequency synchronization | NR-PSS + NR-SSS |
| Physical Cell ID | NR-PSS + NR-SSS |
| SS block index indication | Options: (1) TSS (additional RS); (2) implicitly in NR-PBCH; (3) Explicitly in NR-PBCH |
| SS block time location | Specification indicates fixed set of time domain allocations for SS blocks per carrier frequency range. |

It has not yet been determined how to signal to the UE the SS periodicity and how to signal the UE the frequency domain allocation of SS blocks of the cell. It is noted that the SS periodicity can have values 5 ms, 10 ms, 20 ms, 40 ms, 80 ms or 160 ms. Embodiments described herein provide for a spectrum efficient techniques to signal to the UE, e.g., SS periodicity and SS block time-frequency domain allocation within an NR carrier.

The periodicity of the SS burst set (time after which UE can assume the SS-block to the same direction to be repeated or time after which UE can assume SS block being spatially quasi-co-located) may be signaled for IDLE and CONNECTED mode UEs. For initial cell selection (e.g. cold boot), UE can assume 20 ms periodicity.

Explicit signaling as part of NR-PBCH (or elsewhere as part of SI) is a another way to convey configured SS periodicity of the cell as well as the frequency domain position of SS blocks of the cell within the NR carrier. However, the NR-PBCH should have a high one-shot detection probability at a low signal to noise ratio (SNR) regime. Increasing NR-PBCH payload would also cause a corresponding increase to the required resources in order to have low enough coding rate to meet the one-shot demodulation performance target (e.g. 1% BLER at −6 dB SNR).

Embodiments described herein provide ways to signal, e.g., SS periodicity and/or time-frequency allocation of an SS block. Signaling the information later than NR-PBCH (MIB) or RMSI will make the UE measurements more challenging. A UE may assuming a 20 ms periodicity in the initial cell detection, but the network is not mandated to use that. Therefore, it would be beneficial for the UE to obtain information about the periodicity used by the network as early as possible.

As a part of the timing related information delivery, it has been agreed that a UE can obtain the frame, slot and symbol timing from an SS block. A UE can obtain System Frame Number (SFN) information through, e.g., NR-PBCH and the current assumption is that the SS block timing index (indicating the slot and symbol timing) should be signaled to the UE as part of the NR-PBCH. Some different options for carrying the SS block timing index include encoding it as a part of NR-PBCH payload and carrying it as a part of the DMRS sequence used for NR-PBCH. The maximum number of SS blocks (herein denoted as L) in an SS burst set is frequency band dependent and there is a desire the have unified signaling for different frequency bands. For example, some options currently being considered are:

for frequency bands≤3 GHz, the maximum number of SS blocks may be 1, 2, or 4;
for frequency bands≥3 GHz and ≤6 GHz, the maximum number of SS blocks may be 4, or 8;
for frequency bands≤3 GHz and ≥6 GHz, the maximum number of SS blocks may be 64.

A non-limiting example of an SS block may consist of NR-PSS, NR-SSS, NR-PBCH and DMRS for NR-PBCH, and be constructed so that:

NR-PSS and NR-SSS each occupy 1 symbol
NR-PBCH occupies 2 or more symbols
NR-PSS and NR-SSS each have a bandwidth of 144 subcarriers (sequence lengths are 127 so there are room for some guard subcarriers)
NR-PBCH has a bandwidth of 288 subcarriers
DMRS for NR-PBCH is also spread across 24 PRB (288 subcarriers)
NR-PSS, NR-SSS and NR-PBCH are TDM multiplexed.

As a non-limiting example, <=3 GHz L could be 4; >=3 GHz and <=6 GHz L could be 8; and >=6 GHz L could be 64. L indicates how many SS blocks there can be within SS burst set. It is noted that there may be more time domain locations than L which would provide a possibility e.g. to interleave SS block transmissions among different cells. L could be 8 and a number of possible locations may be 24 (12×2). SS block timing index indicates the location of the SS block, i.e., the index may be larger than L in some cases. The maximum SS block timing index is denoted as R herein.

According to example embodiments, an additional RS acts as a NR-PBCH DMRS and carries signaling partitioned according to certain predefined rules. For example, this RS may be used as PBCH DMRS, namely, interleaved with PBCH subcarriers. However it is noted that this 'additional RS' may also be used in some other arrangement, e.g., as a tertiary synchronization signal multiplexing in frequency with NR-PSS and/or NR-SSS.

The predefined rules may have the following alternatives:

Alternative 1. The signaling space of the RS that is equal to M is partitioned to R and N (where R≥L and M≥R×N), where r (r=0, . . . , R−1) indicates the SS block location index (i.e. SS block location in the fixed set of time domain locations for SS blocks) and n (n=0, . . . , N−1) indicates the SS periodicity. It is noted that both R and L may be carrier frequency dependent and/or numerology dependent, e.g., if cell uses 30 kHz subcarrier spacing for PSS, SSS, PBCH, then R and L may be Y and X, respectively; and if cell uses 60 kHz subcarrier spacing for PSS, SSS, PBCH, then R and L may be 2Y and 2X, respectively.

Alternative 2. The signaling space of RS that is equal to M is partitioned to R and P (where M≥R×P) where r (r=0, . . . , R−1) indicates the SS block location index and p (p=0, . . . , P−1) indicates the index of the frequency domain allocation. In some examples, possible SS block frequency domain allocations could be indexed in the specifications.

In some embodiments, the parameters R, P and/or N may be carrier frequency dependent and a UE may determine the parameters based on the carrier frequency on which the UE is performing the search.

In some example embodiments, the possible values of R and N are jointly coded in such a manner that the limitation set by the R to the feasible SS periodicities is accounted in the signaled values. For instance, if the maximum number of supporter SS blocks leads to time durations that prevent use of certain SS periodicity values (which are too short), then the mapping of the values N accounts for this.

In some embodiments, in case R is larger than a certain predefined value for a given frequency band, then:

In Alternative 1 part or full SS periodicity information may be signaled as part of at least one of: NR-PBCH or remaining system information.
In Alternative 2 part or full information about SS block frequency domain allocation may be signaled in the NR-PBCH or remaining system information.

In case partial information is signaled, the additional RS would signal the UE, e.g., an indication of whether or not the SS block is in the center of the NR carrier or the additional RS would signal the UE SS block frequency domain allocation on more dense frequency raster than the actual SS block frequency raster is.

In some example embodiments, signaling of SS block location index as well as signaling SS periodicity and/or SS block position in frequency domain may be partitioned over multiple stages, such as the following stages for example:

First stage may be NR-SSS detection;
Second stage may be additional RS detection; and
Third stage may be NR-PBCH.

For example, assume that two SS blocks (which may each be 4 symbols long) are mapped onto a 14 symbol slot. Then, an NR-SSS could signal a UE whether the SS block is in the first or second SS block position of the 14 symbol slot. This information could be signaled alongside the signaling of the PCID or part of the PCID. The additional RS may then indicate the r-th slot that carries the detected SS block. An example of this is illustrated in FIGS. 2A-2B.

In an example embodiment, signaling of SS block location index is divided between an additional RS and NR-PBCH. Carrying at least part of the SS block time indexes outside the NR-PBCH could be used to enable some level of soft-combining within the SS burst set and reduce the need to decode the NR-PBCH. It can be understood that if network is well synchronized, which is typically assumed in TDD deployments, once a UE obtains the minimum system information from one cell then the UE could assume synchronization. For frame level synchronization, the possible locations of SS block time locations is related to radio frame and the UE may determine the SS block timing index of neighboring cell base on the serving cell timing knowledge.

Figure 6:
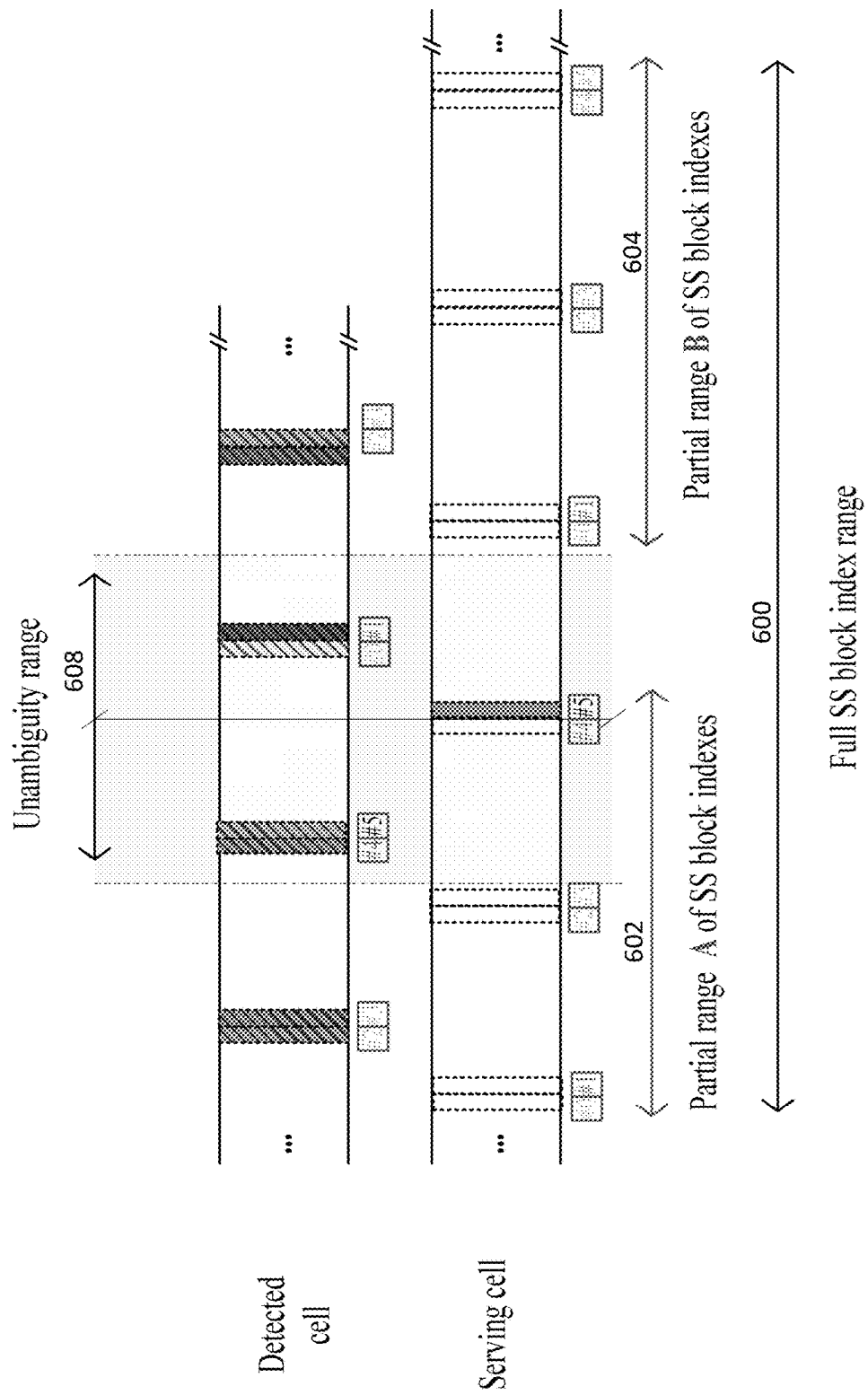
FIG. 6 shows an example where a full SS block index range is divide into two partial ranges for a detected cell and a serving cell in accordance with an example embodiment.

In scenarios where network deployment would allow only relatively loose synchronization, a limited level of synchronization between cells may be assumed, and the serving cell timing cannot be fully relied upon. In such situations, if at least part of the SS block time index information is carried outside the NR-PBCH, and it provides sufficient range to reduce the ambiguity of the possible SS block locations, then the UE may determine the exact timing of the detected cells SS block index based on the full timing information available from serving cell and the partial SS block location index information obtained from the neighbor cell. Based on the partitioned SS block indexing provided by different signals, there would be an unambiguity range for the detected cells SS blocks, and if the network is assumed to be synchronized within this window then the UE can determine the SS block index unambiguously. Referring to FIG. 6, shows an example where the total SS block index 600 range covers a range A 602 and range B 604, the division provided, e.g., by NR-PBCH. The sub-granularity within in each partial range could be, as discussed above, provided by NR-SSS and DMRS sequence indices. Then as long as the network synchronization can be guaranteed to be within this unambiguity range 608, then the UE could determine the exact SS block index without decoding the NR-PBCH.

Figure 2A:
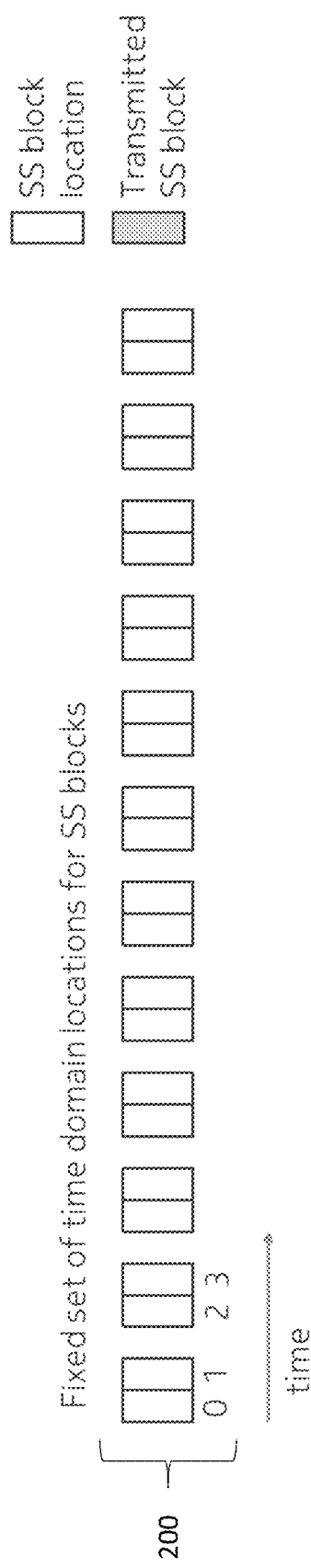
FIG. 2A shows a fixed set of time domain locations for SS blocks, and FIG. 2B a set of fixed time locations for SS blocks in accordance with exemplary embodiments.
Figure 2B:
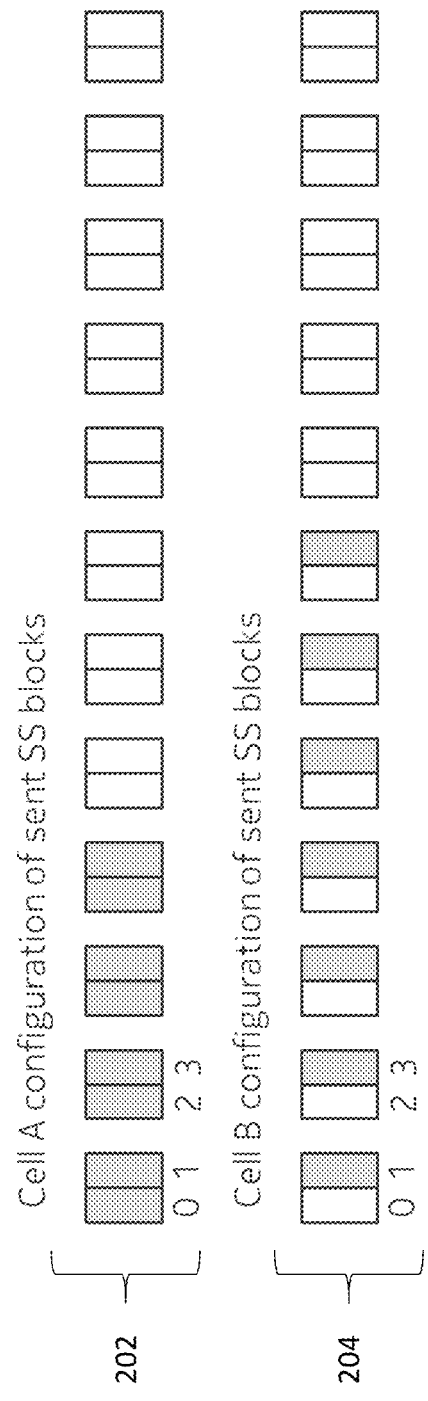
FIG. 2B shows two example cell configurations showing which locations may transmit the SS blocks in accordance with exemplary embodiments.

FIG. 2A illustrates an example set 200 of fixed time locations for SS blocks according to example embodiments. In the example set 200, 12 slots each having two possible SS block locations, and accordingly R is equal to 24. FIG. 2B illustrates an example cell A configuration 202 and an example cell B configuration 204 showing the SS locations that transmit the SS blocks. For bother the cell A configuration 202 and the cell B configuration 202, L is 8 and R is 24 as 8 SS blocks are transmitted.

Figure 3:
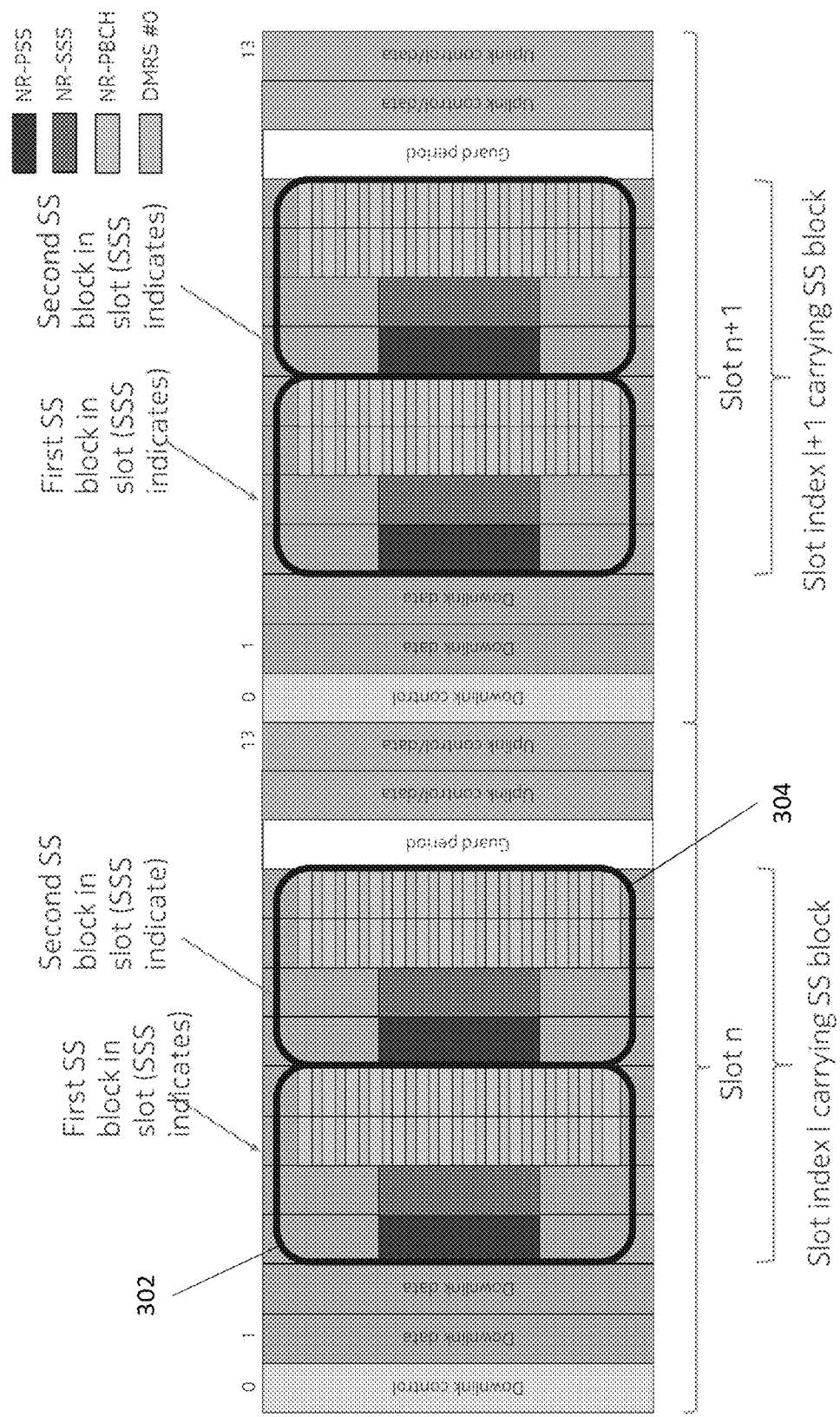
FIG. 3 shows illustrates an example mapping of SS blocks onto symbol slots in accordance with exemplary embodiments.

FIG. 3 shows a non-limiting example mapping of SS blocks onto symbol slots in accordance with exemplary embodiments. In particular, the example shown in FIG. 3 includes two time slots, i.e. slot n and slot n+1, where each time slot comprises 14 symbol slots. Two SS blocks are mapped to each of the time slots as represented by SS block 302, 304. In this example, the NR-SSS may indicate which one of two SS blocks the detected one is and then the additional RS would indicate the r-th number of the "SS block slot".

Figure 4:
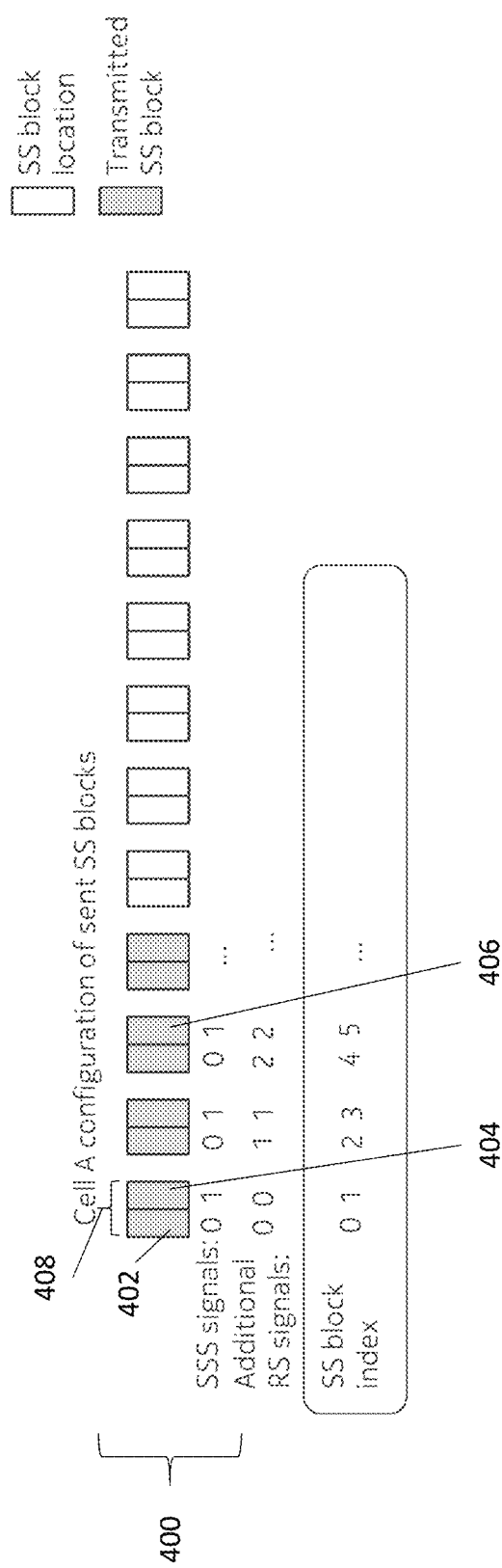
FIG. 4 illustrates an example cell configuration showing which locations may transmit the SS blocks and related signaling information in accordance with an example embodiment.

FIG. 4 illustrates an example cell configuration showing which locations may transmit the SS blocks and signaling information related to the SS block index in accordance with an example embodiment. For example, at SS block index 0, a user equipment receives the first SS block 402 in a set of SS blocks 400. An SSS of the first SS block 402 indicates that it is in the first of two possible SS blocks for the first slot 408 by indicating a value of zero for parameter N. The first SS block 402 also includes an additional RS indicating a value of zero for the parameter R since this is the first slot. Accordingly, the user equipment can determine the SS block index is 0 for SS block 402. In a similar way, the SSS signal corresponding to SS block 406, indicates the value for R is 1, thus indicating that SS block 406 is in the second position. The RS signal for SS block 406 indicates a value of 2 indicating it is in the third slot, and accordingly the user equipment can determine the index of the SS block 406 is 5.

In other example embodiments, signaling information presented above (indicating at least a part of the SS Block index) is modulated onto an additional RS part that has an overlapping frequency domain allocation as the NR-PSS and the NR-SSS in order to alleviate UE power consumption and search complexity. So this bandwidth limitation could be accounted in the additional RS sequence design, for example, so that the additional RS sequence would be influenced/modulated by the SS block index within the limited bandwidth. In another example embodiment the full additional RS sequence design is influenced by the SS block index, but the sequence design allows only limited part to be used, while being able to distinguish the SS block index used to modulate the sequence. This enables a UE to make cell measurements from different cells, for which SS block time index determination is needed (because L3 mobility may be based on SS block specific RSRP).

In accordance with an example embodiment according to Alternative 1, a UE may determine one or more of the following based on carrier frequency ranges:
  UE performing initial cell search and cell measurement on a carrier frequency at below 3 GHz determines that L, N, and R. For example, the UE may determine L is 4, N is 6, and R is 8;
  UE performing initial cell search and cell measurement on a carrier frequency between 3 GHz and 6 GHz and determines L, N, and R. For example, UE may determine L is 8, N is 6, and R is 12;
  UE performing initial cell search and cell measurement on a carrier frequency between 6 GHz and 52.6 GHz and determines L, N, and R. For example, the UE may determine L is 64 and N parameter is not valid at this carrier frequency range, R could be e.g. 64 or 128. Alternatively, the M may be, e.g., 128 and thus N would equal 2 in case R is 64. In this case, n=0 may indicate a default SS periodicity should be applied, and n=1 indicates that SS periodicity should be read from system information (SI).

In some embodiments, the frequency ranges and corresponding values may be predefined, such as in a specification. Thus, the UE may determine these values by retrieving them from a memory for example. It should also be appreciated that there may be more or less than three frequency ranges.

The UE may then detect the NR-PSS and NR-SSS and determine the PCID for the cell. The UE then attempts to detect r and n from an additional RS where r indicates the detected SS block number (SS block location index) and the n indicates SS periodicity used in the cell. For example, if the carrier frequency range is between 6 GHz and 52.6 GHz and if M equals 64, then the UE may assume a default SS periodicity of 20 ms because R would consume the entire signal space of M (e.g., M=R×N=64; L=64).

Alternatively, if M is, e.g., 128 then N would equal 2. For this case, n=0 may indicate the cell has applied a default SS periodicity, and n=1 may indicate the cell has applied a SS periodicity that is different from the default periodicity and that periodicity should be read from system information.

In accordance with an example embodiment according to Alternative 2, a UE may determine based on a set of carrier frequency ranges. For example, there may be three carrier ranges where one or more of the values of L, P, and R are predefined (e.g. by a specification) for each of the carrier frequency ranges. For example,
  The UE performs an initial cell search and cell measurement on a carrier frequency, e.g., below 3 GHz and determines L and P and R. For example, the UE may determine L is 4, P is 8 and R is 8.
  The UE performs an initial cell search and cell measurement on a carrier frequency between, e.g., 3 GHz and 6 GHz to L and P and R. The UE may, for example, determine L is 8, P is 8, and R is 16.
  The UE performs an initial cell search and cell measurement on a carrier frequency between, e.g., 6 GHz and 52.6 GHz and determines L to be 64 and R to be 64. The P parameter may be invalid at this carrier frequency range. Alternatively, the M may be, e.g., 128 and thus P=2. In this case, p=0 may indicate that the cell has applied a default configuration (e.g., that SS block is in the center of NR carrier) and p=1 that SS block location is a different configuration.

The UE may then detect NR-PSS and NR-SSS after which the UE may determine the PCID for the cell.

The UE may then attempt to detect r and p from the additional RS, where a detected r may indicate the detected SS block location number, and where a detected p may indicate the SS block frequency domain allocation being used in the cell. For example, for the carrier frequency range is between 6 GHz and 52.6 GHz, the UE may assume an SS block is in the center of NR carrier until the UE is configured otherwise. The configuration of the SS block location in frequency domain could be signaled as part of NR-PBCH or remaining system information. Alternatively, the M could be e.g. 128 and thus P=2. In this case, the UE determines p=0 that the cell has applied a default configuration, i.e. that SS block is in the middle of NR carrier and n=1 that SS block location within NR carrier is to be indicated in system information.

Figure 5:
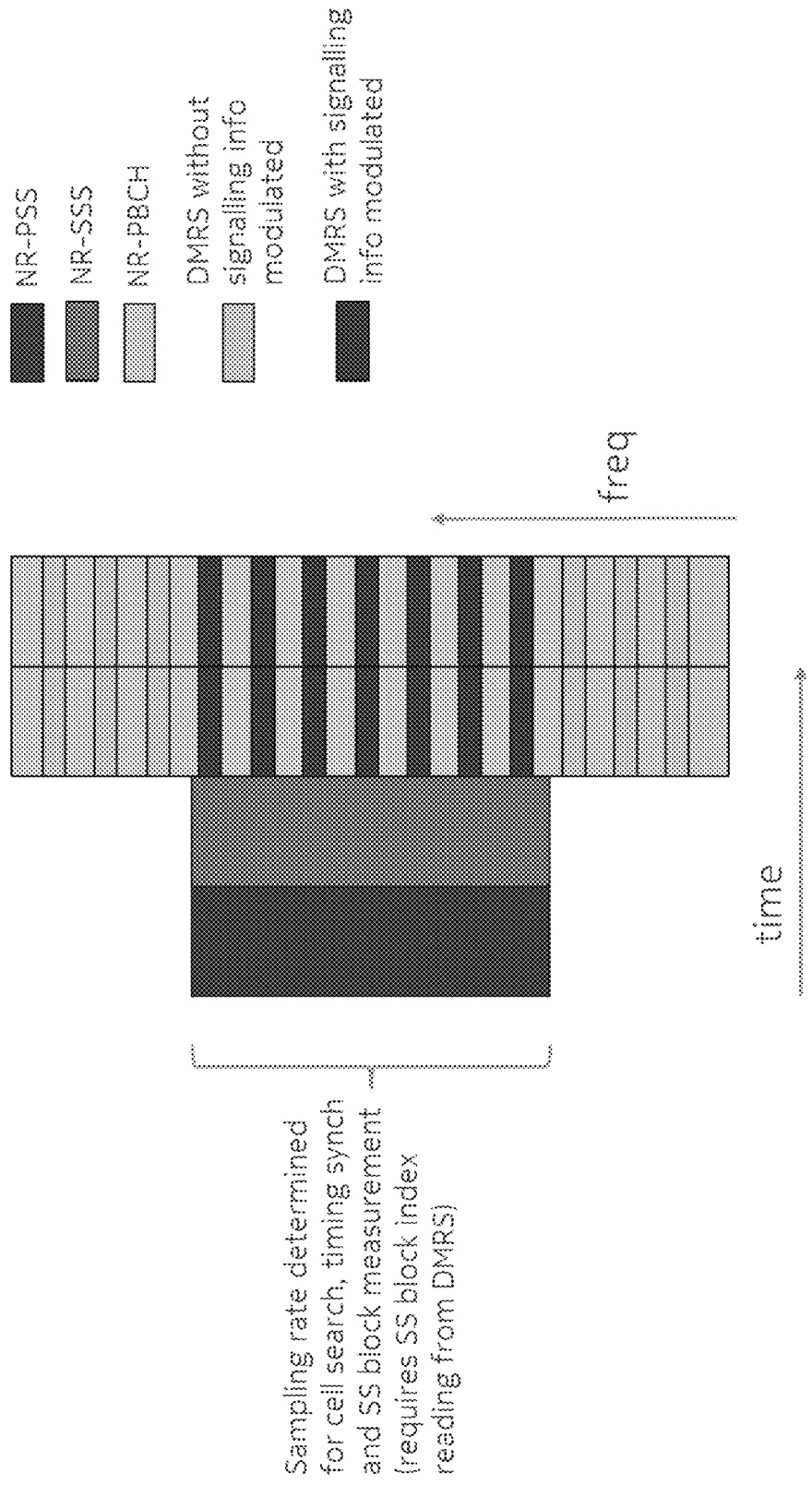
FIG. 5 shows an example of DMRS with signaling information modulated on REs having overlapping frequency domain allocation as NR-PSS and NR-SSS in accordance with an example embodiment.

According to some embodiments, an informative part of the additional RS related to the signaling information above may be on the same frequency location as NR-PSS and NR-SSS. FIG. 5 shows an example of a DMRS with signaling info modulated on resource elements (REs) overlapping in frequency domain allocation with NR-PSS and NR-SSS. The example shown in FIG. 5 assumes 2 symbol NR-PBCH. It is noted that the order of NR-PSS, NR-SSS and NR-PBCH symbols may be different. The DMRS sequence may be e.g. an m-sequence and different signaling values may be implemented via frequency domain cyclic shifts. Assuming 96 REs per DMRS port for either one port or two ports, i.e., 2 REs per PRB per port then there are 96 different frequency domain cyclic shifts available and thus 96 different values to signal. In this design, the UE could also use all DMRS REs (including resource element corresponding to the 'DMRS without signaling information modulated') but with the cost of increased sampling rate required to determine e.g. SS block index.

According to some embodiments, the user equipment may adjust or set timing parameters to synchronize the reception and/or transmission of data. The timing parameters may be set by the user equipment based on the determined SS block location index, periodicity and/or SS block configuration for the given cell.

Figure 7:
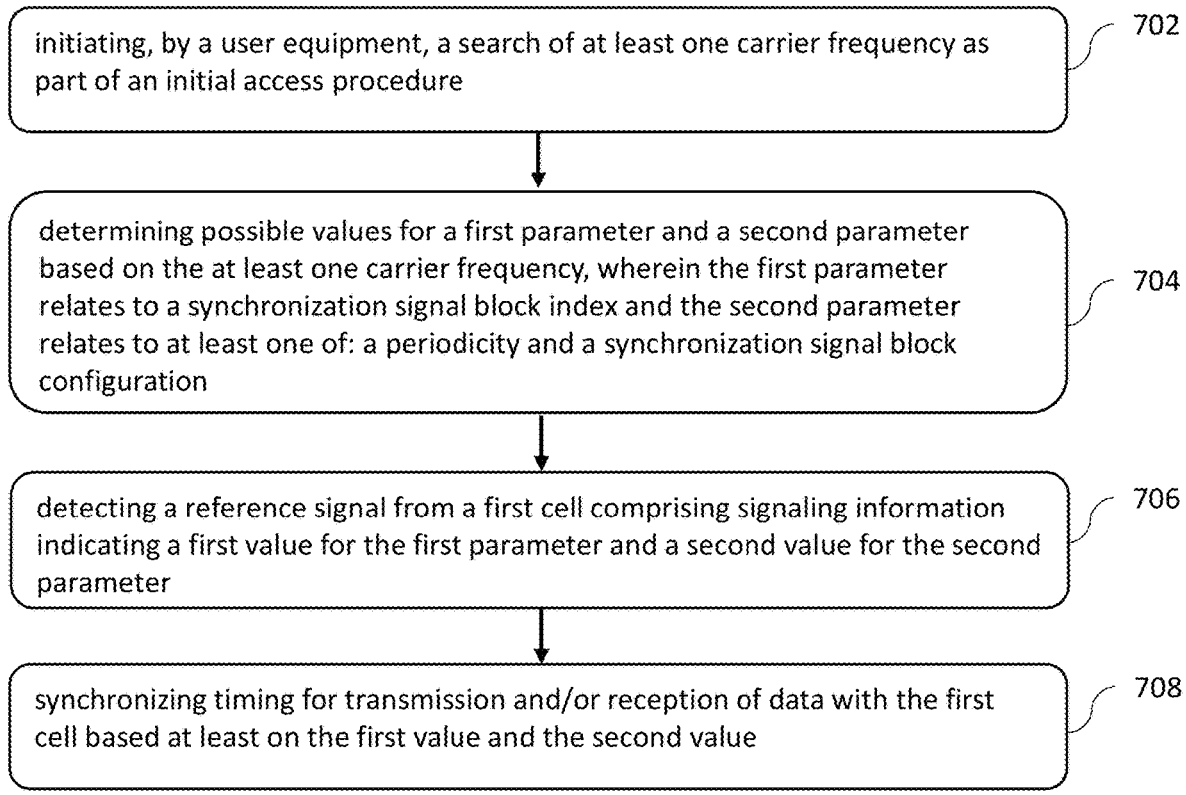
FIGS. 7 and 8 are logic flow diagrams for a signaling procedure for new radio initial access, and illustrate the operation of exemplary methods, a result of execution of computer program instructions embodied on a computer readable memory, functions performed by logic implemented in hardware, and/or interconnected means for performing functions in accordance with exemplary embodiments.

FIG. 7 is a logic flow diagram for a signaling procedure for new radio initial access. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the initial access module 140-1 and/or 140-2 may include multiples ones of the blocks in FIG. 7, where each included block is an interconnected means for performing the function in the block. The blocks in FIG. 7 are assumed to be performed by the UE 110, e.g., under control of the initial access module 140-1 and/or 140-2 at least in part.

According to an example embodiment, a method is provided comprising initiating, by a user equipment, a search of at least one carrier frequency as part of an initial access procedure as indicated by block 702; determining possible values for a first parameter and a second parameter based on the at least one carrier frequency, wherein the first parameter relates to a synchronization signal block index and the second parameter relates to at least one of: a periodicity and a synchronization signal block configuration as indicated by block 704; detecting a reference signal from a first cell comprising signaling information indicating a first value for the first parameter and a second value for the second parameter as indicated by block 706; and synchronizing timing for transmission and/or reception of data with the first cell based at least on the first value and the second value as indicated by block 708.

The second value may indicate the periodicity in which the synchronization signal blocks are transmitted by the first cell. In response to determining that there is one possible value for the second parameter, determining the periodicity of the first cell may be based on the one possible value. For the case the number of possible values of the second parameter exceeds a predefined threshold, the second value may include at least one of: an indication of a default periodicity used by the first cell; and an indication that the periodicity is to be signaled to the user equipment in at least one of: broadcast signaling and system information signaling. The second value may include an indication of the synchronization signal block configuration used by the first cell. For the case the number of possible values of the second parameter exceeds a predefined threshold, the second value may include at least one of: an indication of a default configuration; and an indication that the synchronization signal block configuration for the first cell is to be signaled to the user equipment in a different frequency raster than a raster corresponding to the synchronization signal block of the first cell. The second value may be an index to a plurality of synchronization signal block configurations stored in a memory of the user equipment, and the method may further include: determining the synchronization signal block configuration used by the cell by retrieving the synchronization signal block configuration from the memory according to the index. The method may further include detecting a first synchronization signal and a second synchronization signal from the first cell to determine an identity of the first cell. The reference signal may include a first part including the signaling information and a second part lacking the signaling information such that the first part is signaled on a same frequency location as the first synchronization signal and the second synchronization signal.

An additional example of an embodiment includes a computer program, comprising code for performing a method in accordance with the preceding two paragraphs, when the computer program is run on a processor. The computer program according to this paragraph, wherein the computer program is a computer program product comprising a computer-readable medium bearing computer program code embodied therein for use with a computer.

According to another example embodiment, an apparatus is provided comprising: at least one processor; and at least one non-transitory memory including computer program code, the at least one memory and the computer program code configured to, with the at least one processor, cause the apparatus at least to perform: initiate a search of at least one carrier frequency as part of an initial access procedure; determine possible values for a first parameter and a second parameter based on the at least one carrier frequency, wherein the first parameter relates to a synchronization signal block index and the second parameter relates to at least one of: a periodicity and a synchronization signal block configuration; detect a reference signal from a first cell comprising signaling information indicating a first value for the first parameter and a second value for the second parameter; and synchronize timing for transmission and/or reception of data with the first cell based at least on the first value and the second value.

According to another example embodiment, an apparatus may include: means for initiating, by a user equipment, a search of at least one carrier frequency as part of an initial access procedure; means for determining possible values for a first parameter and a second parameter based on the at least one carrier frequency, wherein the first parameter relates to a synchronization signal block index and the second parameter relates to at least one of: a periodicity and a synchronization signal block configuration; means for detecting a reference signal from a first cell comprising signaling information indicating a first value for the first parameter and a second value for the second parameter; and means for synchronizing timing for transmission and/or reception.

Figure 8:
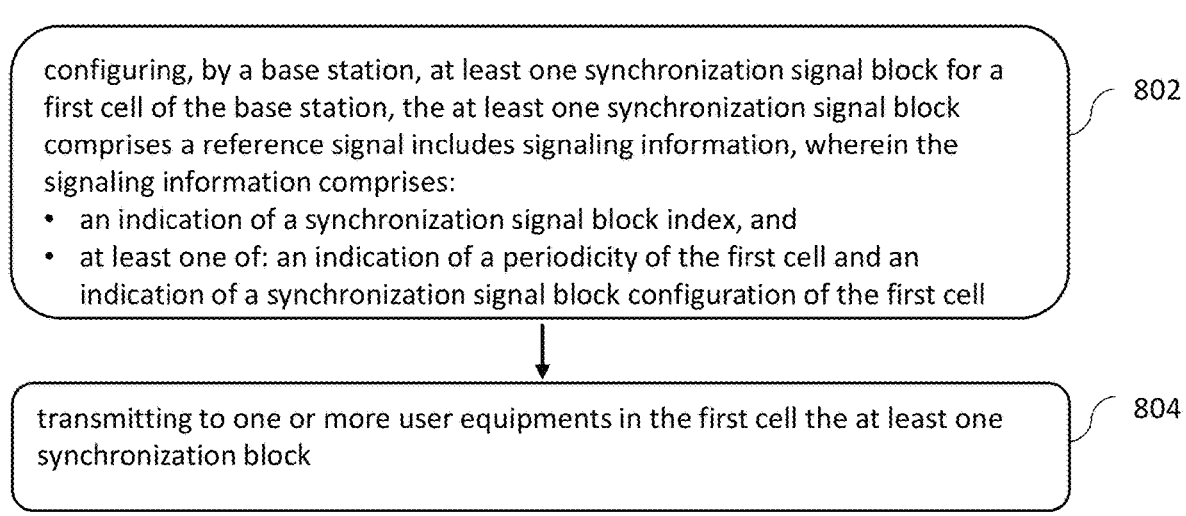

FIG. 8 is a logic flow diagram for a signaling procedure for new radio initial access. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the scheduling module 150-1 and/or 150-2 may include multiples ones of the blocks in FIG. 8, where each included block is an interconnected means for performing the function in the block. The blocks in FIG. 8 are assumed to be performed by a base station such as eNB 170, e.g., under control of the scheduling module 150-1 and/or 150-2 at least in part.

According to an example embodiment, a method is provided comprising: configuring, by a base station, at least one synchronization signal block for a first cell of the base station, the at least one synchronization signal block comprises a reference signal includes signaling information, wherein the signaling information comprises: an indication of a synchronization signal block index, and at least one of: an indication of a periodicity of the first cell and an indication of a synchronization signal block configuration of the first cell as indicted by block 802; and transmitting to one or more user equipments in the first cell the at least one synchronization block as indicted by block 804.

The indication of the periodicity may be indicative of at least one of: the periodicity used by the first cell is a default periodicity; and the periodicity of the first cell is to be signaled in at least one of: broadcast signaling and system information signaling. The indication of the synchronization signal block configuration may be indicative of at least one of: the synchronization signal block configuration for the first cell is a default synchronization signal block configuration; and the synchronization signal block configuration for the first cell is to be signaled in a different frequency raster than a raster corresponding to the synchronization signal block of the first cell. The at least one synchronization signal block may indicate an identity of the first cell via at least one of: a first synchronization signal and a second synchronization. The reference signal may include a first part including the signaling information and a second part lacking the signaling information such that the first part is signaled on a same frequency location as the first synchronization signal and the second synchronization signal.

An additional example of an embodiment includes a computer program, comprising code for performing a method in accordance with the preceding two paragraphs, when the computer program is run on a processor. The computer program according to this paragraph, wherein the computer program is a computer program product comprising a computer-readable medium bearing computer program code embodied therein for use with a computer.

According to another example embodiment, an apparatus may include at least one processor; and at least one non-transitory memory including computer program code, the at least one memory and the computer program code configured to, with the at least one processor, cause the apparatus at least to: configure at least one synchronization signal block for a first cell of a base station, the at least one synchronization signal block comprises a reference signal includes signaling information, wherein the signaling information comprises: an indication of a synchronization signal block index, and at least one of: an indication of a periodicity of the first cell and an indication of a synchronization signal block configuration of the first cell; and transmit to one or more user equipments in the first cell the at least one synchronization block.

According to another example embodiment an apparatus includes: means for configuring at least one synchronization signal block for a first cell of a base station, the at least one synchronization signal block comprises a reference signal includes signaling information, wherein the signaling information comprises: an indication of a synchronization signal block index, and at least one of: an indication of a periodicity of the first cell and an indication of a synchronization signal block configuration of the first cell; and means for transmitting to one or more user equipments in the first cell the at least one synchronization block.

Without in any way limiting the scope, interpretation, or application of the claims appearing below, a technical effect of one or more of the example embodiments disclosed herein is that the NR-PBCH payload can be decreased which increases NR-PBCH detection performance or decreases required time-frequency resources for NR-PBCH to achieve the same performance. Another technical effect of one or more of the example embodiments disclosed herein is that a UE may determine SS periodicity being used by a cell and information from NR-SSS and/or additional RS to perform SS-block-RSRP measurements without reading NR-PBCH. Another technical effect of one or more of the example embodiments disclosed herein is providing a design that allows a UE to determine signaling information from an additional RS (NR-PBCH DMRS) which would allow the UE to use the same sampling rate also to determine SS block index required for SS block specific RSRP measurement.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

| | |
|---|---|
| eNB (or eNodeB) | evolved Node B (e.g., an LTE base station) |
| DMRS | Demodulation Reference Signal |
| I/F | interface |
| LTE | long term evolution |
| MIB | Master Information Block |
| MME | mobility management entity |
| NCE | network control element |
| NR | New Radio |
| NR-PBCH | NR Physical Broadcast Channel |
| N/W | network |
| PCID | Physical Cell ID |
| PSS | Primary Synchronization Signal |
| RRH | remote radio head |
| RS | Reference Signal |
| Rx | receiver |
| SFN | System Frame Number |
| SGW | serving gateway |
| SS | Synchronization Signal |
| SSS | Secondary Synchronization Signal |
| TDM | Time Domain Multiplexing |
| Tx | transmitter |
| UE | user equipment (e.g., a wireless, typically mobile device) |

What is claimed is:

1. A method, comprising:
   initiating, with a user equipment, a search of at least one carrier frequency as part of an initial access procedure;
   determining a first parameter and a second parameter based on the at least one carrier frequency, wherein the first parameter is configured to indicate a portion of a reference signal comprising a first value related to a synchronization signal block index, and the second parameter is configured to indicate a portion of the reference signal comprising a second value related to at least one of:
   a periodicity, or
   a synchronization signal block configuration;
   detecting a reference signal from a first cell comprising signaling information indicating the first value and the second value, wherein the first value is at least partially determined based on the first parameter and the second value is at least partially determined based on the second parameter; and
   synchronizing timing for transmission and/or reception of data with the first cell based at least on the first value and the second value.

2. The method of claim 1, wherein the second value indicates the periodicity in which synchronization signal blocks are transmitted with the first cell.

3. The method of claim 1, wherein the determining of the second parameter comprises determining, based on the at least one carrier frequency, that the second parameter is not valid.

4. The method of claim 2, wherein the second value comprises at least one of:
   an indication of a default periodicity the first cell uses; or
   an indication that the periodicity is to be signaled to the user equipment in at least one of:
      broadcast signaling, or
      system information signaling.

5. The method of claim 1, wherein the second value comprises an indication of the synchronization signal block configuration used with the first cell.

6. The method of claim 1, wherein the second value comprises at least one of:
   an indication of a default synchronization signal block configuration used with the first cell; or
   an indication that the synchronization signal block configuration for the first cell is to be signaled to the user equipment in a different frequency raster than a raster corresponding to a synchronization signal block of the first cell.

7. The method of claim 5, wherein the second value is an index to a plurality of synchronization signal block configurations stored in a non-transitory memory of the user equipment, and wherein the method further comprises:
   determining the synchronization signal block configuration used with the cell, wherein the determining comprises retrieving the synchronization signal block configuration from the memory according to the index.

8. The method of claim 1, further comprising detecting a first synchronization signal and a second synchronization signal from the first cell to determine an identity of the first cell.

9. The method of claim 8, wherein:
   the reference signal comprises a first part including the signaling information and a second part lacking the signaling information such that the first part is signaled on a same frequency location as the first synchronization signal and the second synchronization signal.

10. An apparatus, comprising:
    at least one processor; and
    at least one non-transitory memory including computer program code, the at least one memory and the computer program code configured to, with the at least one processor, cause the apparatus at least to:
    initiate a search of at least one carrier frequency as part of an initial access procedure;
    determine a first parameter and a second parameter based on the at least one carrier frequency, wherein the first parameter is configured to indicate a portion of a reference signal comprising a first value related to a synchronization signal block index, and the second parameter is configured to indicate a portion of the reference signal comprising a second value related to at least one of:
    a periodicity, or
    a synchronization signal block configuration;
    detect a reference signal from a first cell comprising signaling information indicating the first value and the second value, wherein the first value is at least partially determined based on the first parameter and the second value is at least partially determined based on the second parameter; and
    synchronize timing for transmission and/or reception of data with the first cell based at least on the first value and the second value.

11. The apparatus of claim 10, wherein the second value indicates the periodicity in which synchronization signal blocks are transmitted with the first cell.

12. The apparatus of claim 10, wherein determining the second parameter comprises determining, based on the at least one carrier frequency, that the second parameter is not valid.

13. The apparatus of claim 11, wherein the second value comprises at least one of:
    an indication of a default periodicity the first cell uses; or
    an indication that the periodicity is to be signaled to the apparatus in at least one of:
       broadcast signaling, or
       system information signaling.

14. The apparatus of claim 10, wherein the second value comprises an indication of the synchronization signal block configuration used with the first cell.

15. The apparatus of claim 10, wherein the second value comprises at least one of:
- an indication of a default synchronization signal block configuration used with the first cell; or
- an indication that the synchronization signal block configuration for the first cell is to be signaled to the apparatus in a different frequency raster than a raster corresponding to a synchronization signal block of the first cell.

16. The apparatus of claim 14, wherein the second value is an index to a plurality of synchronization signal block configurations stored in the memory of the apparatus, and wherein the at least one memory and the computer program code are configured to, with the at least one processor, cause the apparatus to:
- determine the synchronization signal block configuration used with the cell, wherein the determining comprises retrieving the synchronization signal block configuration from the memory of the apparatus according to the index.

17. The apparatus of claim 10, wherein the at least one memory and the computer program code are configured to, with the at least one processor, cause the apparatus to:
- detect a first synchronization signal and a second synchronization signal from the first cell to determine an identity of the first cell.

18. The apparatus of claim 17, wherein:
- the reference signal comprises a first part including the signaling information and a second part lacking the signaling information such that the first part is signaled on a same frequency location as the first synchronization signal and the second synchronization signal.

19. An apparatus, comprising:
at least one processor; and
at least one non-transitory memory including computer program code, the at least one memory and the computer program code configured to, with the at least one processor, cause the apparatus at least to:
- configure at least one synchronization signal block for a first cell, wherein the at least one synchronization signal block comprises a reference signal including signaling information, wherein the signaling information comprises: an indication of a synchronization signal block index, and at least one of:
  - an indication of a periodicity of the first cell, or
  - an indication of a synchronization signal block configuration of the first cell,
 wherein the signaling information is organized in the reference signal according to a first parameter and a second parameter, wherein the first parameter and the second parameter are based on at least one carrier frequency associated with the first cell; and
- transmit to one or more user equipments in the first cell the at least one synchronization signal block.

20. The apparatus of claim 19, wherein the indication of the periodicity is indicative of at least one of:
the periodicity of the first cell is a default periodicity; or
the periodicity of the first cell is to be signaled in at least one of:
broadcast signaling, or
system information signaling.

* * * * *